(12) United States Patent
Khan

(10) Patent No.: US 7,092,719 B2
(45) Date of Patent: Aug. 15, 2006

(54) METHOD AND AN APPARATUS FOR REDUCTION OF QOS IMPAIRMENTS IN MULTI-MEDIA SERVICES DURING HAND-OVER

(75) Inventor: Moinul H. Khan, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 711 days.

(21) Appl. No.: 10/121,922

(22) Filed: Apr. 11, 2002

(65) Prior Publication Data
US 2004/0203831 A1    Oct. 14, 2004

(51) Int. Cl.
*H04Q 7/20*    (2006.01)
(52) U.S. Cl. .............. 455/452.2; 455/440; 455/435.1
(58) Field of Classification Search ............. 455/436, 455/440, 452.2, 435.1
See application file for complete search history.

(56) References Cited

U.S. PATENT DOCUMENTS 6,230,013 B1 *  5/2001  Wallentin et al. ........... 455/436
6,622,016 B1 *  9/2003  Sladek et al. ............. 455/414.1
2002/0131386 A1 *  9/2002  Gwon ....................... 370/338
2003/0061351 A1 *  3/2003  Prathima et al. ........... 709/226
2004/0137901 A1 *  7/2004  Hamasaki et al. .......... 455/436

FOREIGN PATENT DOCUMENTS

| JP | 60-090441 | 5/1985 |
| JP | 09-046753 | 2/1997 |
| JP | 10-191437 | 7/1998 |

* cited by examiner

*Primary Examiner*—Joseph Feild
*Assistant Examiner*—S. Smith
(74) *Attorney, Agent, or Firm*—Fish & Richardson P.C.

(57) ABSTRACT

A cellular communication system with enhanced Quality-of-Service (QoS) during the hand-off process is disclosed. The system includes a plurality of cells, each including a corresponding base station. Based on the history of a mobile user's positions, the base station of the cell in which the user is located predicts the user's future position. If the future position is in an area covered by another base station (i.e., the target base station), the base station initiates QoS negotiations with the target base station. The target base station allocates resources according to the negotiated QoS if the mobile user enters the area covered by the target base station as predicted.

33 Claims, 4 Drawing Sheets

METHOD AND AN APPARATUS FOR REDUCTION OF QOS IMPAIRMENTS IN MULTI-MEDIA SERVICES DURING HAND-OVER

BACKGROUND

A cellular communication system provides wireless communication services to mobile users. The coverage area of the system is generally divided into a plurality of cells of substantially the same size. Each of the cells includes a base station that connects the mobile users in the cell to remote destinations. The base station provides wireless connections to the mobile users within the same cell. The base station also relays the connections to the remote destinations, typically via other base stations, over landlines, the public switched telephone network (PSTN), or a combination of wireless and wired backbone networks. The base station also allocates resources to the mobile users within the cell. The resource allocations may include time slot assignments, frequency allocations, and QoS (Quality of Service) assurance.

A mobile user may travel away from a first cell to enter a second cell. When that occurs, the mobile user's signal received at the base station of the first cell (i.e., the current base station) may become so weak in power that the signal becomes highly susceptible to interference and noise. To maintain the quality of the connection, the current base station may hand over the connection to the base station of the second cell (i.e., the target base station). The target base station may establish a new connection for the mobile user without alerting the user. This process of handing over a connection from the current base station to the target base station is called a hand-off process.

The hand-off process is generally initiated by the current base station. The current base station first requests the target base station allocate resources for the mobile user with a QoS level acceptable to the user. The target base station then sets up a new connection for the mobile user with the requested QoS. After the new connection is set up, the current base station tears down the current connection to the user, thus completing the hand-off process.

The hand-off process is generally required to be completed in a timely manner to avoid dropping calls or creating glitches. For multi-media transmissions, a delay in the hand-off process around 600–800 ms may cause a loss of approximately 20–38 typical video frames or 30–40 typical voice speech frames.

DETAILED DESCRIPTION

Figure 1:
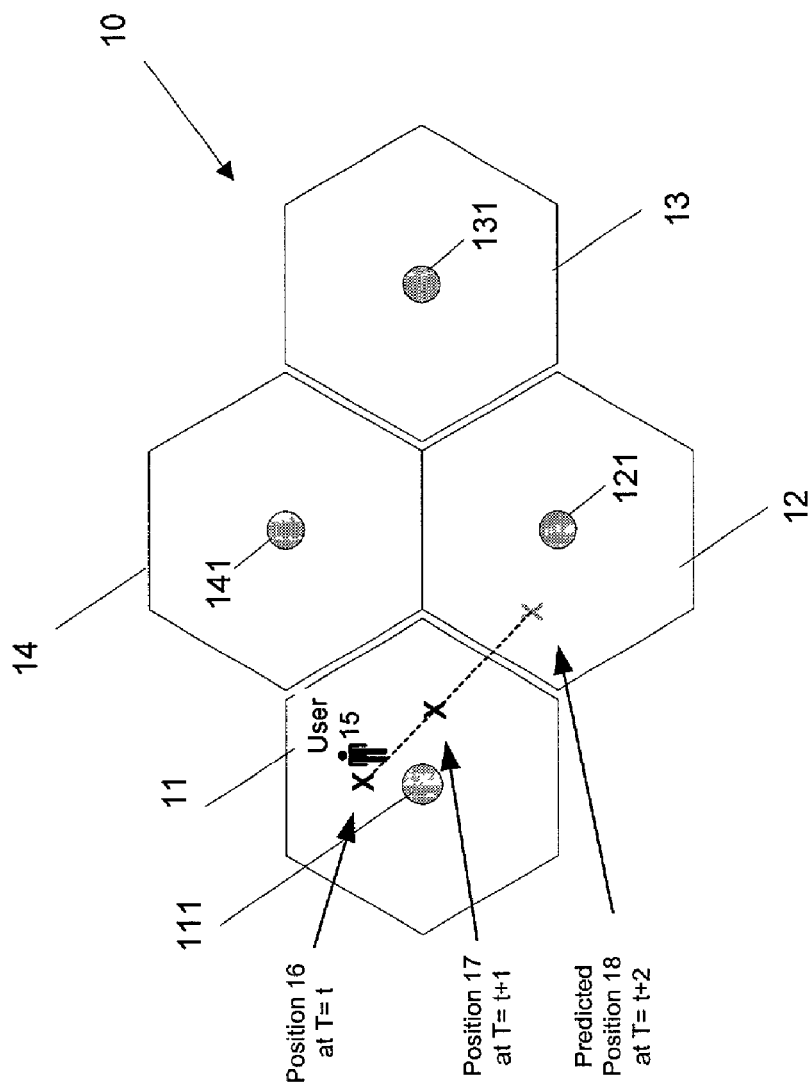
FIG. 1 is an embodiment of a cellular communication system described in the present disclosure.

FIG. 1 illustrates an embodiment of a cellular communication system 10 including a plurality of cells, of which only cells 11, 12, 13, and 14 are shown. The cells 11, 12, 13, and 14 include base stations 111, 121, 131, and 141, respectively. The base stations 111, 121, 131, and 141 manage calls originated from or received by mobile users within the respective cells.

In one scenario, a mobile user 15 in the cell 11 is on a call with a remote user while moving from a location 16 at time t to a location 17 at time t+1. From the path of the movement, the system 10 may predict a future position 18 of the user 15 at the next time instant t+2. If the predicted position 18 lies in another cell, e.g., cell 12 as shown in FIG. 1, the current base station 111 may initiate a hand-off process before the user 15 enters the target cell 12.

In most situations, the prediction is linear because a user typically moves in a substantial straight path within a short prediction period (e.g., from t+1 to t+2 in the above scenario). The linear prediction may be suitable for the situation in which a user is driving on a highway or walking along a street. In other situations, a prediction model based on a spline function or other suitable functions may be used.

The prediction allows the current and the target base stations more time to perform the hand-off process. The amount of time the prediction advances the start of the hand-off process is called the prediction look-ahead time (T_la). The choice of T_la may affect system performance. A large T_la may allow more time for the hand-off process to complete, but may decrease the prediction accuracy because of the increased likelihood that a user may suddenly change the moving direction during the prediction period. In some embodiments, T_la may be less than a second.

Each of the base stations 111, 121, 131, and 141 includes a hand-off manager 21 to carry out the predictions. The hand-off manager 21, as depicted in FIG. 2, samples a user's movement at a predetermined sampling rate (T_update), and predicts the user's future position based on the history of the movement.

Figure 2:
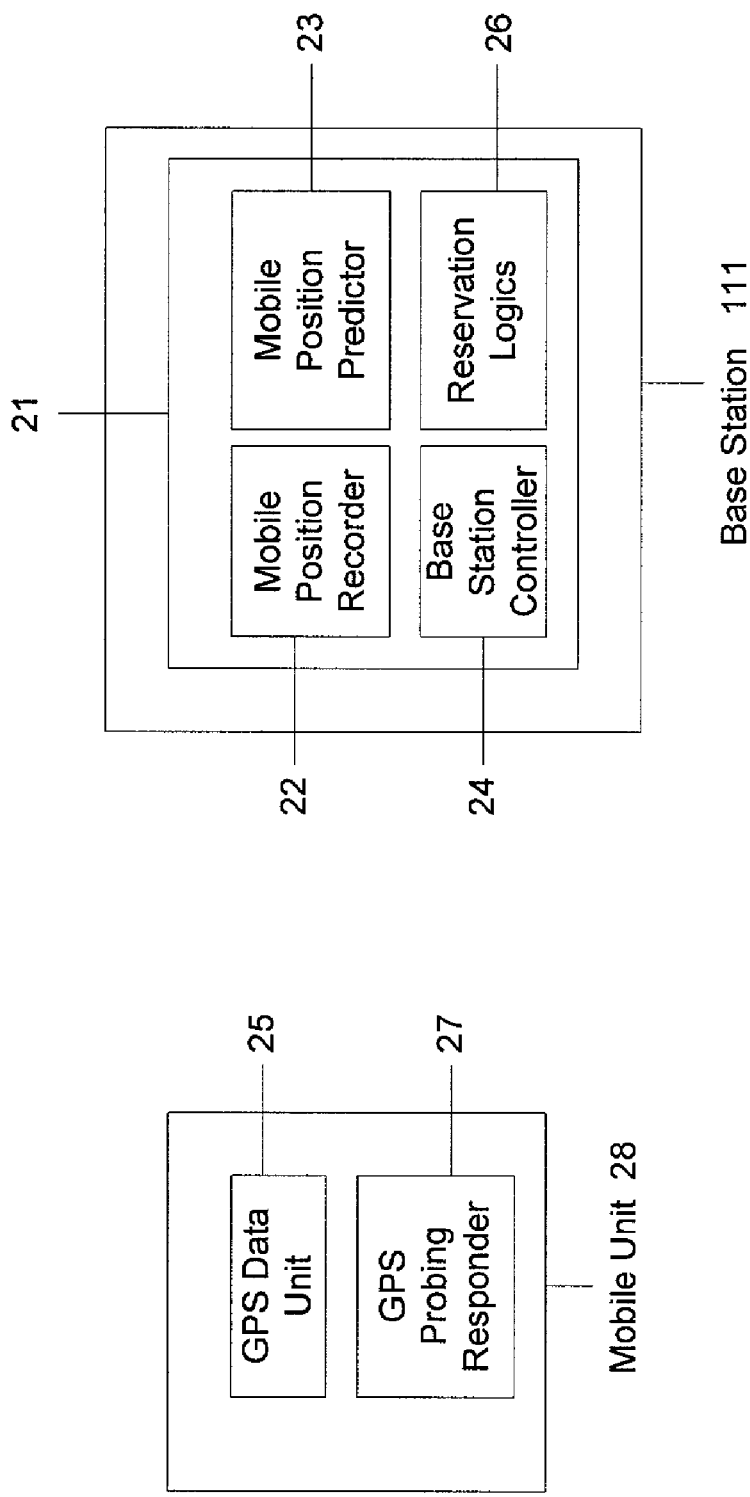
FIG. 2 illustrates the components of a base station and a mobile unit in the system of FIG. 1.

FIG. 2 shows an embodiment of the hand-off manager 21. The embodiment may be implemented in hardware or software. The hand-off manager 21 includes a mobile position recorder 22 which periodically queries the user 15 for position information. The position information may be obtained through use of the GPS (Global Positioning System) or other positioning means. The mobile position recorder 22 then registers the position information. The hand-off manager 21 may also include a mobile position predictor 23 that predicts the user's future positions based on the registered positions. If the user 15 is currently located in cell 11 but the predicted position lies in cell 12, the mobile position predictor 23 invokes a base station controller 24 in the current base station 111. The base station controller 24 then sends a request to the target base station 121 to initiate a resource reservation process. Reservation logics 26 in the target base station 121 receives the request and starts the resource reservation process.

The hand-off manager 21 receives the position information from the user's mobile unit 28. The mobile unit 28 may include a GPS data unit 25 that acquires the user's GPS positions continuously. The mobile unit 28 also includes a probing responder 27 which responds to the inquiries from the mobile position recorder 22 with the acquired GPS positions.

Figure 3:
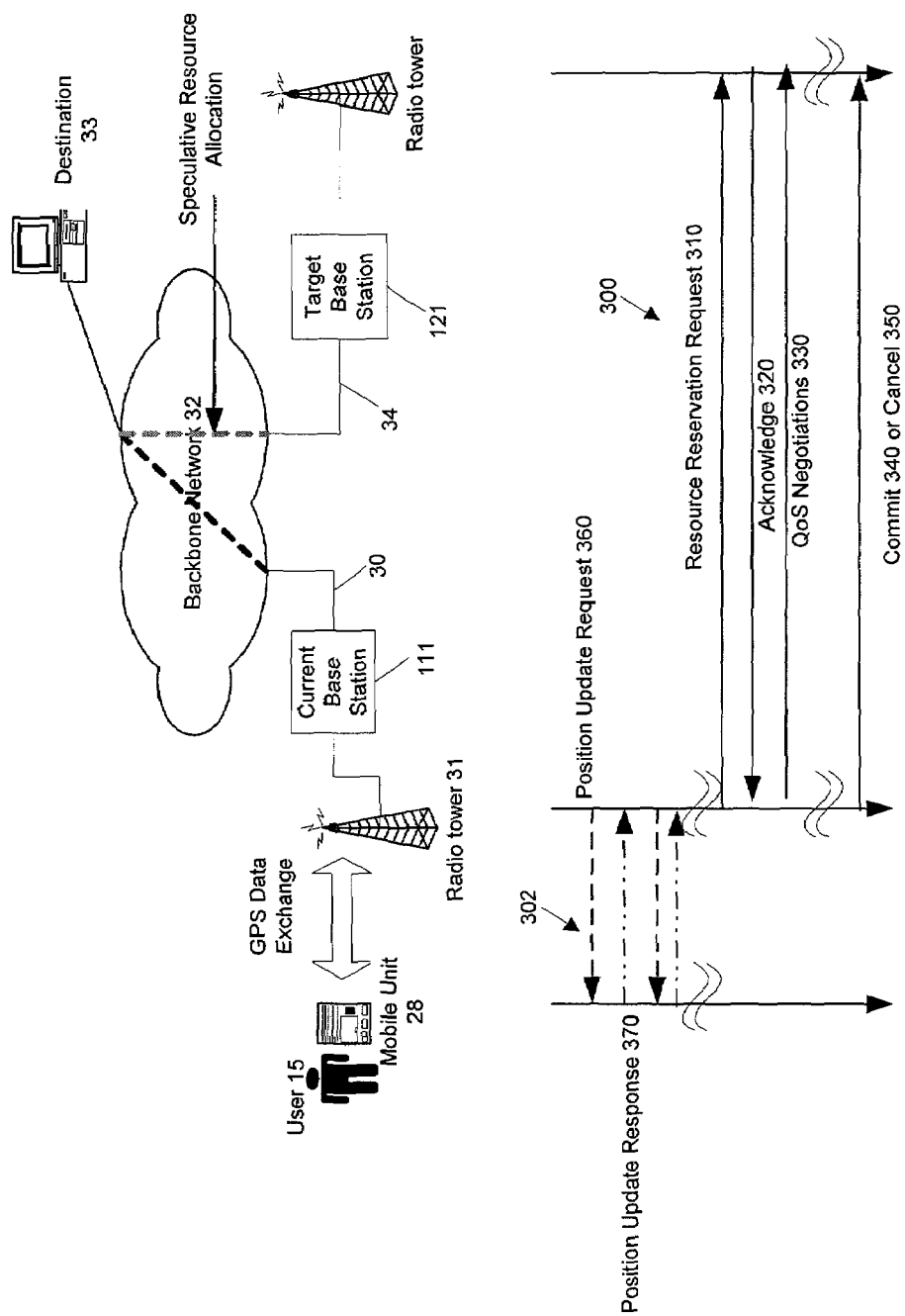
FIG. 3 illustrates a speculative signal path from the mobile unit to a destination and a hand-shaking process which sets up the speculative signal path.

FIG. 3 shows an example of the base station 111 which connects the user 15 to a destination 33 via a signal path 30 through a backbone network 32. Between the base station's radio tower 31 and the user's mobile unit 28, a series of signals 302 are exchanged for updating the positions of the user 15. The signals 302, which include the inquiries 360 and the responses 370, may be transmitted over a wireless channel.

FIG. 3 also shows an example of a hand-shaking process 300 initiated by a resource reservation request 310, which is the request sent from the base station controller 24 of the current base station 111 to the target base station 121. After receiving the request 310, the base station 121 sends an acknowledgement 320 back to the base station 111. The base stations 111 and 121 subsequently start QoS negotiations 330.

The current base station 111 initiates the QoS negotiations 330 by informing the target base station 121 of the QoS requirement of the mobile unit 28. The target base station 121 then negotiates with the backbone network 32. The negotiation between the target base station 121 and the backbone network 32 may include, but is not limited to, data rate, bandwidth, latency, and loss rate guarantees. Due to the predictions, the negotiation may take place before the user 15 enters the coverage area of the target base station 121. Therefore, the target base station 121 may quickly set up a speculative signal path 34 to the destination 33 with the required QoS once the user 15 enters the area as predicted.

If the user 15 moves into the coverage area of the base station 121 as predicted, the base station 111 sends a "commit" signal 340 to the base station 121. Upon receiving the "commit" signal 340, the base station 121 reserves and allocates resources for the negotiated QoS. The resources may include, but are not limited to, buffer space at the switch of the base station 121, the amount of bandwidth given to a connection, and the queue slot or the priority slot assigned to a connection. In some embodiments where computational resources are used to establish a connection, e.g., a connection using a transcoding technology, the base station 121 may allocate a number of processing cycles to the connection to satisfy the negotiated QoS.

On the other hand, if the prediction turns out to be incorrect, e.g., the user 15 moves elsewhere or terminates the call, the base station 111 cancels the request by sending a "cancel" signal 350 to the base station 121. Consequently, no resource is reserved.

The hand-shaking process 300 may require multiple message exchanges between the base stations 111 and 121. Therefore, the hand-shaking process 300 may introduce a delay (HS_delay) into the hand-off process. HS_delay partially offsets the advantage brought by the prediction look-ahead time (T_la); however, T_la may be chosen to exceed HS_delay to retain the benefit of the prediction. In some embodiments, HS_delay may be in the range of 100-200 ms or possibly more.

Advantages of using the predictions may be quantified by an improvement of a call impairment rate. The call impairment includes dropped calls and call glitches occurring in the hand-off process. More specifically, the call impairment includes all the calls that cannot complete the hand-off process before a hand-off deadline (H_deadline). The call impairment rate may depend on parameters including, but not limited to: the prediction look-ahead time (T_la), the user position sampling rate (T_update), the prediction hit rate (P_Hit) which is a number between 0 and 1, the PDF (Probability Distribution Function) of the event in which the resource allocation is completed no later than a given time t_ra (PDF_RA(t_ra)), the hand-off deadline (H_deadline), and the delay due to the hand-shaking process between the current and the target base stations (HS_delay).

Figure 4:
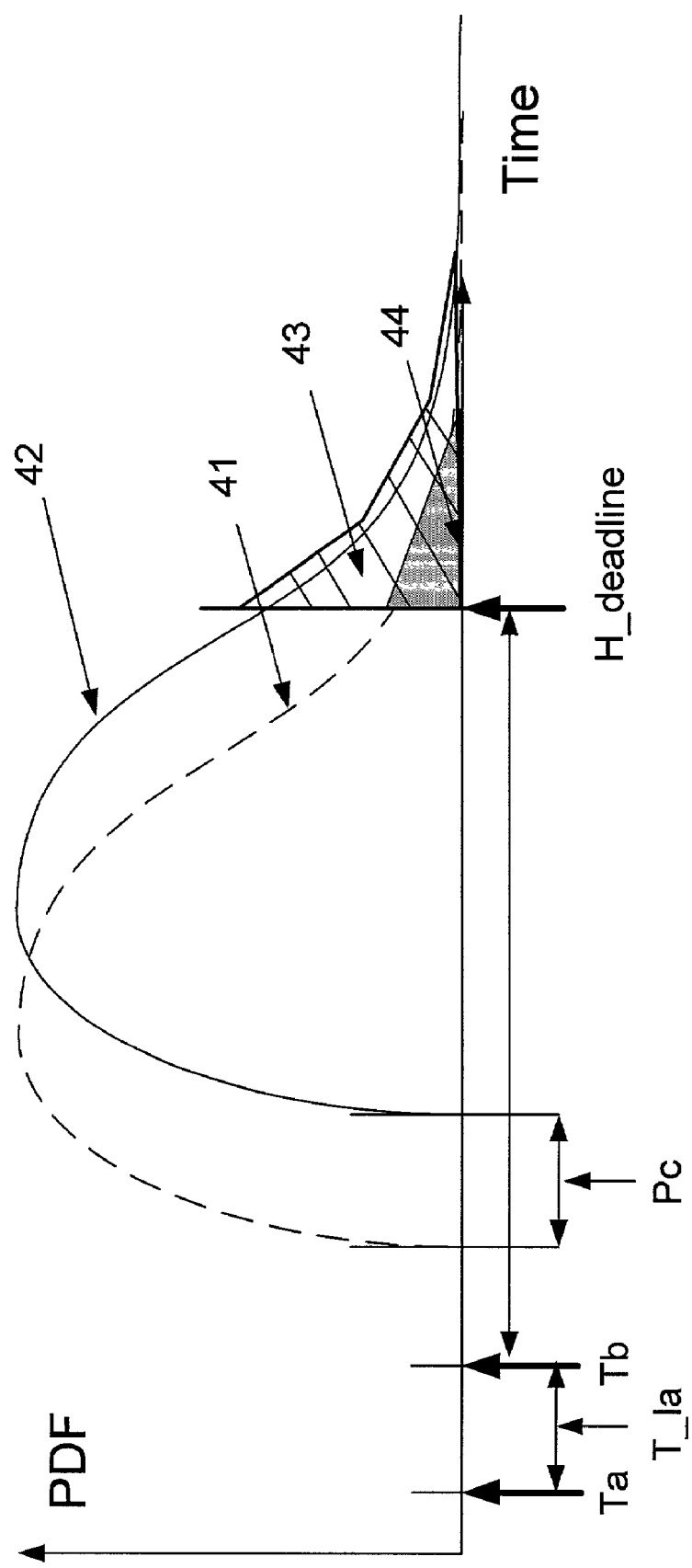
FIG. 4 is an example of a probability distribution function which illustrates an effect of a prediction described in the present disclosure.

FIG. 4 is an example of PDF_RA(t_ra) curves 41 and 42, which represent the situations with and without the prediction, respectively. The two curves 41 and 42 both have a heavy-tail distribution, the value of which approaches zero as the time extends to infinity. Ta and Tb represent the time at which the resource reservation process is initiated with and without the prediction, respectively. Ta leads Tb by the prediction look-ahead time T_la. Similarly, the curve 41 also advances the curve 42 by a time period Pc, which is equal to the prediction look-ahead time (T_la) minus the delay (HS_delay). The hand-off deadline for both curves 41 and 42, however, remains the same. Therefore, the prediction effectively extends the hand-off deadline for the curve 41.

To the right of the hand-off deadline and below the curves 41 and 42, the areas 43, 44 respectively represent the probabilities of the call impairment in the situations with and without the prediction. Because a smaller area (i.e., the area 44) indicates a smaller probability of the call impairment, the situation with the prediction may present an improvement over the situation without the prediction.

The call impairment rate can be characterized as:

$$P\_Hit^* \int_{H\_deadline+T\_la-HS\_delay}^{\infty} PDF\_RA(t)\,dt +$$

$$(1-P\_Hit)^* \int_{H\_deadline}^{\infty} PDF\_RA(t)\,dt.$$

It is noted that $$\int_{H\_deadline+T\_la-HS\_delay}^{\infty} PDF\_RA(t)\,dt < \int_{H\_deadline}^{\infty} PDF\_RA(t)\,dt.$$

Therefore, as the prediction hit rate P_Hit increases, the call impairment rate decreases. The value of P_hit may depend on T_la, T_update, and the prediction model being used, e.g., linear or spline functions.

The present disclosure may be embodied in other specific forms without departing from its spirit or essential characteristics. Accordingly, all other embodiments are within the scope of the following claims.

The invention claimed is:

1. A method for providing a communication link for a user located in a first coverage area, the method comprising:
    predicting a future position based on a history of the user's positions;
    determining whether the future position is in a second coverage area;
    negotiating link quality with a station of the second coverage area if the future position is in the second coverage area; and
    reducing a call impairment rate by increasing an accuracy of the prediction, wherein the increased accuracy extends a time for negotiating link quality.

2. The method of claim 1 further comprising:
    reserving resources at the station of the second coverage area to establish the communication link with the negotiated link quality.

3. The method of claim 1 further comprising acquiring a history of the user's positions from a global positioning system.

4. The method of claim 1 further comprising:
    choosing a predetermined look-ahead time by which the future position leads a user's current position.

5. The method of claim 1 wherein the future position is predicted using a linear prediction model.

6. The method of claim 1 wherein the future position is predicted using a spline prediction model.

7. The method of claim 1 wherein the link quality is negotiated for a pre-determined Quality-of-Service (QoS).

8. The method of claim 1 wherein the call impairment rate comprises a measure of dropped calls and call glitches that occur in a hand-shaking process between a station in the first coverage area and the station in the second coverage area.

9. The method of claim 8 wherein the call impairment rate further comprises calls that cannot complete the hand-shaking process before a hand-off deadline (H_deadline).

10. The method of claim 1 wherein the call impairment rate comprises a plurality of prediction parameters, wherein the plurality of prediction parameters comprise: a prediction look-ahead time (T_la), a user position sampling rate (T_update), a prediction hit rate (P_Hit), a Probability Distribution Function (PDF_RA(t_ra)) of an event in which a resource allocation is completed in time t_ra, a hand-off deadline (H_deadline), and a delay (HS_delay) related to a hand-shaking process between a station for the first coverage area and the station for the second coverage area.

11. The method of claim 10 wherein a value of T_la exceeds a value of MS_delay.

12. The method of claim 10 wherein T_la comprises an amount of time the prediction advances a start of the hand-shaking process.

13. The method of claim 10 wherein H_deadline comprises a time limit to complete the hand-shaking process.

14. The method of claim 10 wherein T_update comprises samples of the user's positions at a predetermined sampling rate (T_update).

15. The method of claim 10 wherein the prediction hit rate (P_Hit) comprises a number between 0 and 1.

16. The method of claim 10 wherein P_hit depends on T_la, T_update, and a prediction model.

17. The method of claim 16 wherein the prediction model comprises a linear or a spline prediction model.

18. The method of claim 10 wherein the handshaking process comprises:
  initiating a resource reservation request to send to the station for the second coverage area;
  acknowledging the request from the station for the first coverage area; and
  negotiating a Quality-of-Service (QoS) among the station in the first coverage area, the station in the second coverage area, and a backbone network.

19. The method of claim 18, wherein the handshaking process further comprises:
  reserving resources for the negotiated Quality-of-Service if the user moves into the second coverage area as predicted; and
  if the prediction is incorrect, canceling the resource reservation request.

20. A system comprising:
  a plurality of cells;
  a plurality of base stations, wherein each of the plurality of base stations is located within and corresponding to each of the plurality of cells;
  a position recorder in each of the base stations to record a mobile unit's positions within the corresponding cell: and
  a predictor coupled to each of the position recorders to receive the recorded positions and predict a future position based thereon, wherein the predictor is configured to use a predetermined look-ahead time for the predicted future position to lead a mobile unit's current position, and wherein the predictor is further configured to reduce a call impairment rate by extending a hand-oft deadline (H deadline).

21. The system of claim 20, wherein each of the base stations further includes reservation logics to reserve resources if the future position is predicted to be in the corresponding cell.

22. The system of claim 21, wherein the reserved resources satisfy a Quality-of-Service (QoS) requirement.

23. The system of claim 20, wherein the position recorder obtains the mobile unit's positions from a Global Positioning System (GPS) device on the mobile unit.

24. The system of claim 20, wherein the call impairment rate comprises calls that cannot complete a call-handling transition between at least two base stations before the hand-off deadline (H deadline).

25. The system of claim 20 further comprising a network that interconnects the base stations.

26. The system of claim 20 further comprising a wireless network that connects each of the base stations to mobile units in the corresponding cell.

27. A method comprising:
  predicting a user's future position based on a history of the user's positions;
  communicating between a station that covers a user's current position and a station that covers the user's future position;
  reserving resources at the station that covers the user's future position; and
  reducing a call impairment rate by using the prediction of the user's future position, wherein the call impairment rate comprises a measure of dropped calls and call glitches that occur in the communicating and reserving, wherein the call impairment rate comprises a plurality of prediction parameters, and wherein the call impairment rate is reduced by extending a hand-off deadline (H deadline).

28. The method of claim 27 wherein the resources are reserved to satisfy a Quality-of-Service (QoS) requirement.

29. The method of claim 27, wherein the plurality of prediction parameters comprise: a prediction look-ahead time (T_la), a user position sampling rate (T_update), a prediction hit rate (P_Hit), a probability distribution function (PDP_RA(t_ra)) of an event in which a resource allocation is completed in time t_ra, the hand-off deadline (H_deadline), and a delay (HS_delay) related to the communicating between the station that covers the user's current position and the station that covers the user's future position.

30. The method of claim 27 further comprising: choosing a predetermined look-ahead time by which the future position leads the user's current position.

31. A machine-accessible medium with executable instructions stored thereon that, when accessed, perform the following operations:
  predict a user's future position based on a history of the user's positions;
  communicate between a station that covers a user's current position and a station that covers the user's future position,
  reserve resources at the station that covers the user's future position; and
  reduce a call impairment rate by using the prediction of the user's future position, wherein the call impairment rate comprises a measure of dropped calls and call glitches that occur in the communicating and reserving, wherein the call impairment rate comprises a plurality of prediction parameters, and wherein the call impairment rate is reduced by extending the hand-off deadline (H deadline).

32. The article of claim 31, the instructions further operable to cause the machine to reserve the resources to satisfy a Quality-of-Service (QoS) requirement.

33. The method of claim 31, wherein the plurality of prediction parameters comprise: a prediction look-ahead time (T_la), a user position sampling rate (T_update), a prediction hit rate (P_Hit), a Probability Distribution Function (PDF_RA(t_ra)) of an event in which a resource allocation is completed in time t_ra, a hand-off deadline (H_deadline), and a delay (HS_delay) related to the communicating between the station that covers the user's current position and the station that covers the user's future position.

* * * * *